278. LAND VEHICLES- ANIMAL
DRAFT APPLIANCES.

BEST AVAILABLE COPY

Oct. 4, 1927. Re. 16,756

T. TORKELSON

DRAFT ATTACHMENT FOR VEHICLES

Original Filed Nov. 1, 1922

INVENTOR.
THEODORE TORKELSON.
BY HIS ATTORNEYS

Williamson Reid & Williamson

278. LAND VEHICLES- ANIMAL DRAFT APPLIANCES.

Draftsma

Reissued Oct. 4, 1927. Re. 16,756

UNITED STATES PATENT OFFICE.

THEODORE TORKELSON, OF MABEL, MINNESOTA.

DRAFT ATTACHMENT FOR VEHICLES.

Original No. 1,526,189, dated February 10, 1925, Serial No. 593,354, filed November 1, 1922. Application for reissue filed April 22, 1926. Serial No. 103,976.

My invention relates to an improvement in draft attachments for vehicles.

In some modern vehicles such as the well known standard manure spreader, the body of the wagon is quite long and the greater weight is at the rear of the body. When the load is partially unloaded there is all the more weight at the rear portion of the body. The draft means to which the usual tongue is connected, are commonly connected to the front portion of the wagon body or frame. When the load is at the rear of the body, there is a tendency to swing the forward part of the frame and body upward, and the strain of pulling the vehicle and load is transmitted through the front portion of the frame and body. This results in an excessive strain being placed on the front portion of the frame and body which often loosens and damages the same. It is an object of this invention, therefore, to provide a connection for the tongue and draft means whereby the tongue is lowered and a draft means is provided having connections running directly to the rear portion of the wagon body or frame, so that there is a direct pull on the rear portion of the body or frame and this pull is preferably in a downward direction.

The object is to provide a draft attachment capable of being used with any kind of vehicle to which draft animals are hitched.

The present invention is attachable to the front axle and tongue of the vehicle.

A represents a bracket preferably made from a bar of sheet metal, the same being held by a clamp or other means 1, to a plate or other portion at the front of the vehicle at its upper end, and to take the pulling strain, draft rods 2 are connected by a hook, or other means, 3, to a clevis 4 secured to the lower end of the bracket A which draft rods extend to the plates 5 of which there are two, one being bolted to each side of the vehicle.

Figure 1:
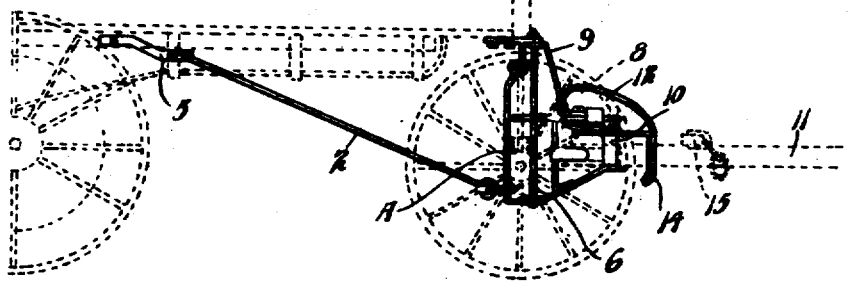
Fig. 1 is a view in side elevation; the vehicle being indicated by dotted lines.

A bolt 6 extends vertically from the lower end of the bracket A through the plates 7 and 8 and a bracket 9 extends from the upper end of the bolt to the tongue support 10 through which the tongue 11, as shown in dotted lines in Fig. 1, extends for attachment to the vehicle.

Figure 2:
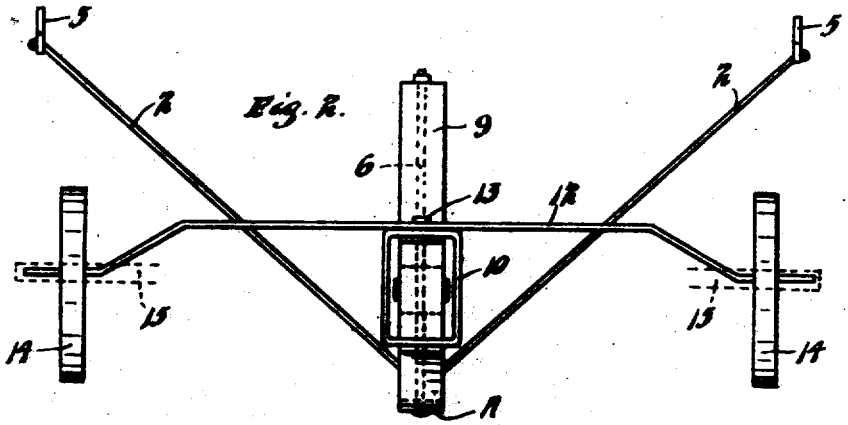
Fig. 2 is a front view of the attachment.
Figure 3:
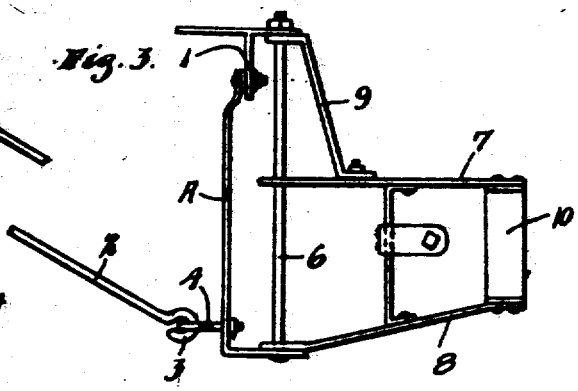
Figs. 3 and 4 are detached details.
Figure 4:
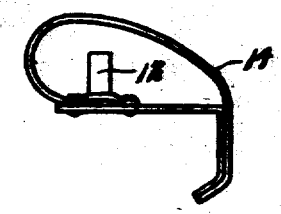

A crossbar 12 is secured to the tongue support 10 by bolts 13 and other means and this crossbar 12 carries guards 14, of which there are two extending downwardly and in position to limit the backward movement of the whiffle-tree 15 indicated in dotted lines in Figs. 1 and 2, the whiffle-tree being pivoted in the usual manner upon the tongue 11. When the tongue 11 is turned the whiffle tree 15 will engage one of the guards 14 and will be lifted by the inclined front surface of the guard, so that the whiffle tree will thus be prevented from striking the wheels.

By means of this attachment the strain of the draft is distributed and the entire draft mechanism is attachable to different types of vehicles such as wagons, manure spreaders and the like.

With the structure shown and described, it will be seen that the pull upon the tongue 11 will, through the tongue support 10, pull upon the bolt 6. This pull will be transmitted to the lower end of bracket A and this pull will be transmitted directly through the rods 2 to the rear portion of the vehicle body and frame. This pull or draft which is thus directly on the rear portion of the body will greatly relieve the stress on the front portion of the body and frame where the connection has heretofore been made, and the pulling stress will be applied at the point where the load is greatest. The stress transmitted through the load 2 also pulls downwardly on the vehicle body and frame, so that the tendency of the front portion of the body to rise is counteracted. The pulling stress, especially when starting the vehicle, is thus much more efficiently distributed.

What I claim is:—

1. A draft attachment for vehicles having a body, a crossbar supported forwardly of the body, and guards mounted on the crossbar adjacent the outer ends thereof, said guards extending downwardly from the crossbar and being rearward of a whiffle-tree in position to be engaged thereby for regulating the backward movement of the whiffle-tree.

2. A draft attachment for vehicles having a body, a bracket secured to the vehicle adjacent the front of said body, the lower end of said bracket being bent laterally, a tongue support disposed an appreciable distance below the upper end of said bracket, a bolt extending upwardly from the lateral end of the bracket and secured to said body and passing through the tongue support, a member embracing and extending from the upper end of the bolt downwardly and forwardly to the tongue support and secured to the latter, plates secured to the sides of the vehicle rearward of the center thereof, and rods extending from the lower end of the bracket to the plates for distributing the draft to a point rearward of the center of the vehicle.

3. A draft attachment for vehicles comprising in combination with a wagon body, a tongue supporting member disposed an appreciable distance below said body, a member extending from said body to the top of said tongue support, a bracket secured at its upper end to said vehicle adjacent the front of said body, and having a portion at its lower end supporting said tongue supporting member, and a pair of draft rods extending from the lower end of said bracket upwardly and rearwardly and secured at their rear ends to the sides of said vehicle whereby the draft on the tongue of the wagon is transmitted through said bracket and rods to the rear of said body.

4. A draft attachment for vehicles comprising in combination with a wagon body, a tongue supporting member disposed an appreciable distance below said body, a bracket secured at its upper end to said vehicle adjacent the front of said body, and having a portion at its lower end projecting forwardly and supporting said tongue supporting member, a pivot member on which the tongue supporting member is pivoted extending upwardly from said end of said bracket an appreciable distance above said tongue supporting member and a member pivoted at its upper end on said pivot member extending downwardly and forwardly and secured at its lower end to said tongue supporting member and a pair of draft rods extending from the lower end of said bracket upwardly and rearwardly and secured at their rear ends to the sides of said body whereby the draft on the tongue is transmitted through said bracket and rods to the rear of said body.

5. A draft structure for vehicles comprising a body, a tongue support having a rectangular front portion and top and bottom members, having in combination, a bar extending from the front lower portion of said body and extending downwardly and forwardly and secured to the top member of said tongue support, another bar secured to said vehicle adjacent the front of said body, beneath and in the rear of said first mentioned bar and extending downwardly a considerable distance and having a forwardly projecting portion on which the bottom member of said tongue support is mounted, a bolt extending through said forwardly projecting portion upwardly through the top and bottom members of said tongue support and through said first mentioned bar and secured at its upper end to said body and a pair of draft rods secured to said second mentioned bar adjacent its lower end and extending rearwardly and upwardly and secured at their other ends respectively to the sides of the vehicle body.

6. A draft attachment for vehicles comprising in combination with the body of a vehicle, a pivot rod secured to said body and extending vertically downward therefrom, a member embracing said pivot rod at its upper end and extending downwardly and forwardly therefrom, a tongue support comprising vertically spaced members pivoted at its rear portion on said pivot rod and having the upper of said spaced members secured to said first mentioned member, means secured to and depending from said vehicle adjacent the front of said body, and secured to said pivot rod and supporting the lower of said spaced members of said tongue support and spaced means securing said last mentioned means respectively to the sides of said vehicle adjacent the rear thereof.

7. A draft attachment for the body of a vehicle, comprising a tongue support disposed an appreciable distance below said body at the front end thereof, means extending downwardly and forwardly from said body and secured to said tongue support, a bracket secured to said vehicle adjacent the front of said body, and extending vertically downward therefrom and at its lower end bent to extend forwardly and beneath said tongue support for supporting the same, a member supported by said body and secured to said bracket and on which the tongue support is pivoted, and means extending from said bracket to the rear of said vehicle and secured respectively at each side thereof.

In testimony whereof I affix my signature.

THEODORE TORKELSON.